(12) United States Patent
Eich et al.

(10) Patent No.: US 12,071,073 B2
(45) Date of Patent: Aug. 27, 2024

(54) PARKING ASSISTANCE SYSTEM

(71) Applicant: Conti Temic microelectronic GmbH, Nuremberg (DE)

(72) Inventors: Markus Eich, Ulm (DE); Charlotte Gloger, Ulm (DE); Frank Kittmann, Ulm (DE); Markus Friebe, Gefrees (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 156 days.

(21) Appl. No.: 17/593,954

(22) PCT Filed: Mar. 18, 2020

(86) PCT No.: PCT/DE2020/200019
§ 371 (c)(1),
(2) Date: Sep. 29, 2021

(87) PCT Pub. No.: WO2020/200373
PCT Pub. Date: Oct. 8, 2020

(65) Prior Publication Data
US 2022/0161723 A1   May 26, 2022

(30) Foreign Application Priority Data
Apr. 2, 2019   (DE) .................... 10 2019 204 656.8

(51) Int. Cl.
*B60R 1/00*   (2022.01)
*B60R 11/04*   (2006.01)
(Continued)

(52) U.S. Cl.
CPC .............. *B60R 1/002* (2013.01); *B60R 11/04* (2013.01); *G06T 7/75* (2017.01); *G06V 10/44* (2022.01);
(Continued)

(58) Field of Classification Search
CPC .............. G06K 9/00771; B60R 25/102; B60R 25/302; B60R 25/305
See application file for complete search history.

(56) References Cited

U.S. PATENT DOCUMENTS 10,025,997 B2 *   7/2018   Han .................... B62D 15/0285
10,384,718 B1 *   8/2019   Kentley-Klay ........ G08G 1/168
(Continued)

FOREIGN PATENT DOCUMENTS

CN   103907147 A   7/2014
CN   107249934 A   10/2017
(Continued)

OTHER PUBLICATIONS

German Search Report dated Feb. 19, 2020 for the counterpart German Patent Application No. 10 2019 204 656.8.
(Continued)

*Primary Examiner* — Peter D Le

(57) ABSTRACT

The exemplary embodiments relate to a parking assistance system for a vehicle, designed to present surroundings of the vehicle. The parking assistance system can include at least one camera designed to record at least one image. The parking assistance system may use a grid structure to present the surroundings of the vehicle for a user. Additionally, the parking assistance system may have an image evaluation unit designed to determine the relative position and the orientation of another vehicle depicted in the image. Additionally, the image evaluation unit may be designed to adapt a grid structure on the basis of the determined orientation of the other vehicle, with the image being projected onto the adapted grid structure.

16 Claims, 2 Drawing Sheets

(51) Int. Cl.
*G06T 7/73* (2017.01)
*G06V 10/44* (2022.01)
*G06V 20/58* (2022.01)

(52) U.S. Cl.
CPC ...... *G06V 20/586* (2022.01); *B60R 2300/806* (2013.01); *G06T 2207/30264* (2013.01)

(56) References Cited

U.S. PATENT DOCUMENTS

| | | | |
|---|---|---|---|
| 11,293,764 B2* | 4/2022 | Tagawa | G01C 21/34 |
| 2003/0197660 A1* | 10/2003 | Takahashi | G08G 1/168 |
| | | | 345/7 |
| 2004/0249564 A1* | 12/2004 | Iwakiri | B62D 15/027 |
| | | | 340/932.2 |
| 2004/0260439 A1* | 12/2004 | Endo | B60Q 1/48 |
| | | | 348/148 |
| 2005/0285758 A1* | 12/2005 | Matsukawa | G06V 10/25 |
| | | | 340/932.2 |
| 2006/0192660 A1* | 8/2006 | Watanabe | B60R 1/00 |
| | | | 348/E7.086 |
| 2007/0219721 A1* | 9/2007 | Heimberger | G01S 7/52001 |
| | | | 701/300 |
| 2007/0279493 A1* | 12/2007 | Edanami | B62D 15/028 |
| | | | 348/148 |
| 2010/0228426 A1* | 9/2010 | Suzuki | B62D 15/0275 |
| | | | 701/31.4 |
| 2010/0235053 A1* | 9/2010 | Iwakiri | B62D 15/027 |
| | | | 701/41 |
| 2012/0262288 A1* | 10/2012 | Moussa | B60Q 1/2665 |
| | | | 340/475 |
| 2013/0002861 A1 | 1/2013 | Mitsugi | |
| 2014/0055487 A1* | 2/2014 | Kiyo | B60R 1/00 |
| | | | 345/629 |
| 2014/0278065 A1 | 9/2014 | Ren | |
| 2014/0355822 A1* | 12/2014 | Choi | G06V 20/586 |
| | | | 382/103 |
| 2014/0375812 A1 | 12/2014 | Ehlgen | |
| 2015/0057920 A1 | 2/2015 | Von Zitzewitz et al. | |
| 2015/0100177 A1* | 4/2015 | Inagaki | B62D 15/0285 |
| | | | 701/1 |
| 2015/0143913 A1* | 5/2015 | Adams | G06V 20/52 |
| | | | 382/104 |
| 2015/0258989 A1* | 9/2015 | Okano | B60W 40/105 |
| | | | 701/1 |
| 2016/0350974 A1 | 12/2016 | Hashimoto | |
| 2017/0018085 A1 | 1/2017 | Cano | |
| 2017/0285629 A1* | 10/2017 | Christen | B62D 15/0285 |
| 2017/0341582 A1 | 11/2017 | Friebe et al. | |
| 2017/0371340 A1* | 12/2017 | Cohen | G06V 20/584 |
| 2018/0164830 A1* | 6/2018 | Moosaei | G05D 1/0246 |
| 2019/0311546 A1* | 10/2019 | Tay | G05D 1/0088 |
| 2020/0134777 A1* | 4/2020 | Yamamoto | G06T 3/00 |

FOREIGN PATENT DOCUMENTS

| | | |
|---|---|---|
| DE | 102011084554 A1 | 4/2013 |
| DE | 102012005851 A1 | 9/2013 |
| DE | 102012018325 A1 | 3/2014 |
| DE | 102014204303 A1 | 9/2015 |
| DE | 112010005646 B4 | 6/2016 |
| DE | 112014006149 T5 | 9/2016 |
| EP | 2234399 A1 | 12/2009 |
| JP | 2013084130 A | 5/2013 |
| WO | 2014159330 A1 | 10/2014 |

OTHER PUBLICATIONS

International Search Report and the Written Opinion of the International Searching Authority mailed on May 25, 2020 for the counterpart PCT Application No. PCT/DE2020/200019.
Notice of Reasons for Refusal Drafted Sep. 28, 2022 for the counterpart Japanese Patent Application No. 2021-550060.
Japanese Notice of Refusal dated May 31, 2023 for the counterpart Japanese Patent Application No. 2021-550060 and DeepL translation of same.
Chinese First Office Action dated Jun. 1, 2023 for the counterpart Chinese Patent Application No. 202080018875.8 and DeepL translation of same.
European Examination Report mailed on Jul. 9, 2024 for the European Patent Application No. 20 718 552.1 and machine translation of same.

* cited by examiner

PARKING ASSISTANCE SYSTEM

CROSS REFERENCE TO RELATED APPLICATIONS

This application is a National Stage Application under 35 U.S.C. 371 of International Application No. PCT/DE2020/200019 filed on Mar. 18, 2020, which claims priority from DE 10 2019 204 656.8, filed on Apr. 2, 2019, the disclosures of which are herein incorporated by reference in their entireties.

FIELD OF INVENTION

The invention relates to a parking assistance system for a vehicle, designed to present surroundings of the vehicle. In addition, the invention relates to a method for presenting the surroundings of a vehicle as well as a program unit and a computer-readable medium.

BACKGROUND

During the presentation of three-dimensional surroundings of a vehicle in a surround-view system, the distance from other cars and objects is not known, unless additional sensors are deployed. Typically, the three-dimensional surroundings are generated with the aid of a hemisphere, with the images captured by the cameras being projected onto the hemisphere. This typically leads to optical artifacts if the projected object is closer to the vehicle than the associated projection surface of the hemisphere. In particular, this can make it difficult to maneuver a car during the process of pulling into or out of a parking space. By using various sensors such as, for example, sonar or lidar, the distance between the objects which triggers the optical artifacts and the car which is to be maneuvered can be established; however, it is a costly and elaborate process to position these sensors in the relevant car.

SUMMARY

An improved parking assistance system can be advantageously provided with embodiments of the invention.

The invention is defined in the independent claims. Advantageous further developments of the invention are set out in the dependent claims and in the following description.

Technical terms are used in their generally known form. If a specific meaning is transferred to specific terms, definitions of terms are provided below, within the framework of which the terms are used.

An aspect of the invention relates to a parking assistance system for a vehicle, designed to present surroundings of the vehicle. The parking assistance system can include at least one camera designed to record at least one image. The parking assistance system can use a grid structure to present the surroundings of the vehicle for a user. Additionally, the parking assistance system can have an image evaluation unit designed to determine an orientation of another vehicle depicted in the image. Additionally, the image evaluation unit can be designed to adapt a grid structure on the basis of the determined orientation of the other vehicle, with the image being projected onto the adapted grid structure.

The advantage of this embodiment can be that, due to the adaptation of the grid structure to another vehicle, the maneuvering of a car during the process of pulling into or out of a parking space or similar is simplified for the user. In addition, it can be an advantage that other expensive sensor devices can be dispensed with and, simultaneously, the maneuverability of the vehicle can be improved. Additionally, the perception for a user of the parking assistance system can be improved since optical artifacts no longer appear in the displayed image.

In other words, the parking assistance system captures an image with the aid of a camera, which image is processed by the image evaluation unit, so that an orientation of another vehicle can be established in order to adapt or to optimize a grid structure to present the surroundings of the vehicle, so that the recorded image can be projected onto the adapted grid structure. The camera can be a digital camera which has a signal connection to the logic of the vehicle and/or the image evaluation unit. The parking assistance system can be in a position to present the surroundings of the vehicle on the display and/or on the head-up display with the aid of a monitor, for example an ECU electronic control unit and/or a head-up display. The grid structure can be a virtual model which can be presented with the aid of nodes and the connections thereof. The orientation of the other vehicle can in particular be fixed based on a coordinate system, wherein the origin of the coordinate system constitutes the midpoint of the vehicle, for example. A possible construction of the parking assistance system and the orientation of the other vehicle are represented, inter alia, in FIG. 1 and are further explained in the associated description of the figure. The position of the other vehicle with respect to the vehicle can be determined on the basis of the midpoint of the vehicle. The grid structure can be adapted based on the position or the orientation of the other vehicle so that it can correspond to the reality of the vehicle surroundings. The adapted grid structure, which has been adapted to the surroundings of the vehicle, is used to project the image recorded by the camera onto the adapted grid structure so that an adapted presentation of the surroundings can be presented on the monitor or the head-up display of the vehicle.

An adapted grid structure is represented in FIG. 3 and explained in detail based on the description of FIG. 3.

According to an exemplary embodiment, the grid structure can comprise a geometrical form, in particular a hemisphere. In other words, the grid structure forms a virtual model of a hemisphere or similar. Alternatively, the grid structure can also comprise a different geometrical form to a hemisphere such as, for example, a cone, a frustrum, a cube, a cuboid, a cube having considerably rounded edges, a cuboid having considerably rounded edges, a pyramid, a cylinder and/or a sphere. An advantage of this embodiment can be that computing capacity within the parking assistance system can be saved with the aid of a simple geometrical form and, consequently, the production costs of the parking assistance system can be reduced.

In an exemplary embodiment of the invention, the image evaluation unit can be designed to adapt the geometrical form, by means of bending or similar, to the orientation of the other vehicle. In other words, the geometrical form is adapted such that it corresponds to the surroundings of the vehicle. This can be effected in particular by means of a bending process of the geometrical form or another reshaping process such as, for example, cutting out, enlarging, decreasing, rotating and/or distorting. The advantage of this embodiment can be that the geometrical form can be adapted by means of simple computing operators such as, for example, bending and, consequently, the presentation of the surroundings of the vehicle can be simplified, without committing other resources of the parking assistance system. A possible embodiment of the presentation including the geometrical form is represented in FIG. 2 and explained in detail in the associated description of the figure.

According to an exemplary embodiment, the grid structure can additionally comprise a generic vehicle model. In other words, a generic vehicle model is positioned in the grid structure, which comprises a geometrical form, in order to consequently be able to present the surroundings of the vehicle in an improved manner. The generic vehicle model can be a two-dimensional and/or three-dimensional model which presents, in its outer contour, an idealized model of the other vehicle. Alternatively, a type of the other vehicle can be established, wherein the generic vehicle model can be adapted, based on information from a database, to the type of the other vehicle. The image recorded by the camera can be projected onto the generic vehicle model so that the presentation of the surroundings of the vehicle can be improved since optical artifacts due to missing distance information can no longer appear. In FIG. 3, a possible embodiment of the generic vehicle model, which is arranged in the geometrical form, is shown.

According to an exemplary embodiment of the invention, the image evaluation unit can be designed to adapt the generic vehicle model, by means of scaling, movement and/or rotation, to the orientation of the other vehicle. In other words, the generic vehicle model within the grid structure is manipulated such that it corresponds to an orientation of the other vehicle. This manipulation can in particular be carried out by a scaling, moving and/or rotating. By means of these operators such as, for example, rotating the generic vehicle model, the surroundings of the vehicle can be adapted very precisely to the grid structure, in particular to the generic vehicle model, so that the presentation is clearly improved and, consequently, the ergonomics of the parking assistance system can be increased.

According to an embodiment, the image evaluation unit can be designed to adapt the generic vehicle model in the geometrical form, by means of scaling, movement and/or rotation, to the orientation of the other vehicle. In other words, the generic vehicle model within the geometrical form, which is for example a hemisphere, can be scaled, moved and/or rotated in order to achieve an optimized presentation of the surroundings of the vehicle. In other words, a positioning of the generic vehicle model within the geometrical form is consequently possible so that both the geometrical form and the generic vehicle model can be adapted to the surroundings of the vehicle, in particular on the basis of one another, in order to clearly increase the presentability of the surroundings of the vehicle.

According to an exemplary embodiment, the image evaluation unit can be designed such that regions of the other vehicle, which are not captured by the camera, are established by means of an estimating function and are projected onto the generic vehicle model. In other words, the function of the image evaluation unit is that the regions which cannot be captured by the camera such as, for example, a roof of the other vehicle, are established with the aid of the estimating function. The estimating function can, for example, include the camera establishing the color of the other vehicle or the paintwork of the other vehicle and projecting the established color or paintwork likewise onto the roof of the generic vehicle model of the other vehicle. This can have a beneficial effect on the user's perception and, consequently, increase the ergonomics of the parking assistance system.

According to an exemplary embodiment, the image evaluation unit can be designed to predict regions, which are not captured by the camera, in order to completely overlay the grid structure with a texture. In other words, a grid structure which is, for example, a sphere, can be completely overlaid with a texture with the aid of the image evaluation unit since the image evaluation unit, based on exemplary weather information, overlays the upper part of the sphere with a texture based on the weather information. For example, the weather function describes a clear sky so that the image evaluation unit predicts a clear sky in the grid structure. This can bring with it the advantage that the user has a better feel for the presentation of the surroundings of the vehicle and, consequently, the ergonomics of the parking assistance system is improved.

According to an exemplary embodiment of the invention, the image evaluation unit for determining the orientation of the other vehicle can be designed to recognize a bottom surface in the image. Furthermore, the image evaluation unit can be designed to identify two wheels of the other vehicle in the image and to establish a circumferential contour of the wheels in each case. In addition, the image evaluation unit can be designed to form an intersection between the bottom surface and the circumferential contour by establishing the point on the circumferential contour of the wheel closest to the camera. In other words, the orientation of the other vehicle can be effected with the aid of an image evaluation method, as just described, wherein the bottom surface, in particular a road or similar, is first established in the image. Two wheels of the other vehicle can then be identified in the image and then a circumferential contour of the wheels can be established or deduced. In this case, it is assumed that the wheels of the other vehicle are fundamentally lined up orthogonally to the bottom surface, which has been recognized in the image. On the basis of the circumferential contour, an intersection between the bottom surface and the circumferential contour is established by selecting the point in the circumferential contour which is located nearest to the camera. This can bring with it the advantage that, based on characteristic features such as, for example, of the wheels, the orientation of the other vehicle can be established quickly and reliably so that an improved presentation of the vehicle surroundings can be guaranteed. A possible embodiment of the establishment of the intersections and, consequently, of the orientation of the other vehicle is shown in FIG. 4 and described in the associated description of the figure. In an alternative embodiment, other characteristics of the other vehicle can also be used, based on which the orientation of the other vehicle can be determined.

According to an exemplary embodiment, the image evaluation unit can further be designed to perform a plausibility check of the bottom surface, the wheels, the circumferential contour, the intersections and/or the orientation of the other vehicle. In other words, the parking assistance system is in a position to check the information captured by it based on predefined parameters and/or experimental values. For example, the image evaluation unit can check the establishment of the wheels of the other vehicle so that it is guaranteed that the first and the second wheel belong to the same vehicle. This can bring with it the advantage that the reliability of the presentation of the surroundings of the vehicle is increased.

According to an exemplary embodiment, the image evaluation unit can be designed to establish a front region and/or rear region of the other vehicle and to orientate the grid structure on the basis of the front region and/or the rear region. In other words, the image evaluation unit is in a position to establish the front and the rear of the other vehicle in order to adapt the generic vehicle model of the other vehicle in accordance with the contour of the front section and the rear section of the other vehicle, so that a more realistic presentation of the other vehicle in the surroundings of the vehicle can be achieved.

Another aspect relates to a method for presenting the surroundings of a vehicle which can have the following steps:

recording an image of the surroundings of the vehicle,
presenting the surroundings of the vehicle by means of a grid structure,
determining an orientation of another vehicle depicted in the image,
adapting the grid structure on the basis of the orientation of the other vehicle,
projecting the image onto the adapted grid structure.

In other words, an image of the surroundings of the vehicle can be recorded. To present the surroundings of the vehicle, a grid structure can be used or presented to a user, in particular by means of a display or a head-up display. Furthermore, the orientation of the other vehicle can be determined by establishing information in which the other vehicle is depicted and, consequently, an orientation of the other vehicle can be evaluated. On the basis of the orientation of the other vehicle, the grid structure for presenting the surroundings can be adapted so that the grid structure corresponds to the actual surroundings of the vehicle. Additionally, the image which was recorded can be projected onto the adapted grid structure. This can bring with it the advantage that sensors which establish the distance between the vehicle and the other vehicle can be dispensed with. In addition, the experience of the user, who has the surroundings of the vehicle presented to him, can be improved.

According to an exemplary embodiment, the method can further have the steps of:

recognizing a bottom surface in the image,
identifying two wheels of the other vehicle in the image,
establishing a circumferential contour of the wheels,
forming an intersection between the bottom surface and the circumferential contour by establishing the point on the circumferential contour of the wheel closest to the camera,
determining the orientation of the other vehicle on the basis of the intersection.

In other words, the orientation of the other vehicle can be effected with the aid of a recognition of the bottom surface in the image. Furthermore, two wheels of the other vehicle in the image can be identified and a circumferential contour of the wheels can be established. An intersection can then be formed or established, wherein the intersection is the intersection between the bottom surface and the circumferential contour, which is nearest to the camera. The orientation of the other vehicle can be determined with the aid of the two intersections which can each stand for a wheel of the other vehicle. It is assumed that the wheels are oriented orthogonally to the bottom surface. This can bring with it the advantage that the orientation of the other vehicle can be established based on image information and, consequently, expensive sonar or lidar sensors can be dispensed with. A possible embodiment of how an intersection can be formed is shown in FIG. 4 and is further explained in the associated description of the figure.

According to an exemplary embodiment, the method can further have the steps of:

configuring a geometrical form, in particular a hemisphere,
modifying the geometrical form, in particular by means of bending or similar, on the basis of the orientation of the other vehicle in order to configure the adapted grid structure.

In other words, a geometrical form, which can be for example a hemisphere, is adapted by means of bending or similar such that the geometrical form corresponds to the surroundings of the vehicle. The geometrical form is modified on the basis of the orientation of the other vehicle so that artifacts, which result due to the absence of distance information between the vehicle and the other vehicle, can be reduced and, consequently, the presentation of the surroundings of the vehicle is improved for the user.

According to an exemplary embodiment of the invention, the method can further have the steps of:

forming a generic vehicle model,
positioning the generic vehicle model in the geometrical form,
adjusting the generic vehicle model, by means of scaling, movement and/or rotation, on the basis of the orientation of the other vehicle in order to configure the adapted grid structure.

In other words, a generic vehicle model, which is a two-dimensional or three-dimensional model, is positioned in the geometrical form such that it corresponds to the orientation of the other vehicle in the virtual depiction of the surroundings. The generic vehicle model can be adapted or adjusted by means of scaling, movement and/or rotation so that it corresponds to both the contour and the orientation of the other vehicle and, consequently, an adapted grid structure is configured. This can bring with it the advantage that the process of pulling the vehicle into or out of a parking space is simplified by the improved presentation of the surroundings. A possible embodiment of the positioning of a generic vehicle model in a geometrical form is shown in FIG. 3 and is further explained in the associated description of the figure.

Another aspect of the invention relates to a program unit which, if it is run in a parking assistance system, instructs the parking assistance system to perform the steps of the method, as described above and below.

Another aspect of the invention relates to a computer-readable medium, on which a program unit, as described above and below, is stored.

These and other features of the invention are explained with reference to the embodiments described below.

BRIEF DESCRIPTION OF THE FIGURES

The figures are merely schematic and not to scale. In the figures, the same, similarly acting or similar elements can be provided with the same reference numerals.

DETAILED DESCRIPTION OF EXEMPLARY EMBODIMENTS

Figure 1:
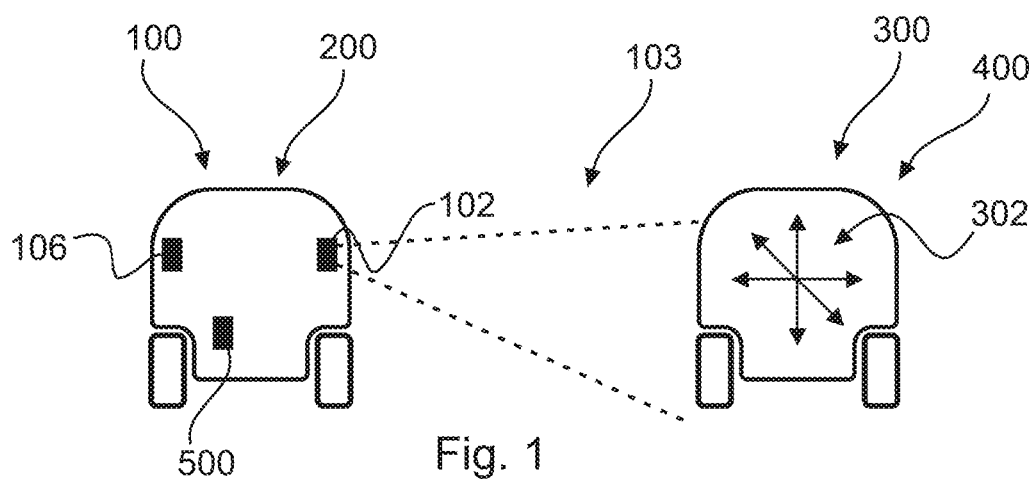
FIG. 1 shows a parking assistance system according to an exemplary embodiment.

FIG. 1 shows a parking assistance system 100 for a vehicle 200, designed to present surroundings of the vehicle, wherein the parking assistance system 100 has at least one camera 102 designed to record an image in particular of the other vehicle 300. The camera 102 comprises a detection region 103. The image evaluation unit 106 can be designed to predict, for example, the color of the other vehicle 300 on components of the other vehicle 300, which are located outside the detection region 103. The parking assistance system 100 uses a grid structure to present the surroundings of the vehicle 200 for a user. The parking assistance system 100 can further have an image evaluation unit 106 designed to determine an orientation 302 of another vehicle 300 depicted in the image. Furthermore, the image evaluation unit 106 can be designed to adapt the grid structure 104 on the basis of the determined orientation 302 of the other vehicle 300. The image evaluation unit 106 can also be designed to project the image onto the adapted grid structure 108. FIG. 1 further shows the parking assistance system 100 which is arranged in the vehicle 200. Another vehicle 300 is located next to the vehicle 200. The vehicle 200 comprises a camera 102 which records an image which can be utilized to present the surroundings 400 of the vehicle 200. Additionally, the vehicle 200 comprises an image evaluation unit 106 as well as a computer-readable medium 500. The other vehicle 300 comprises an orientation 302 which can in particular be established on the basis of the position of the vehicle 200.

Figure 2:
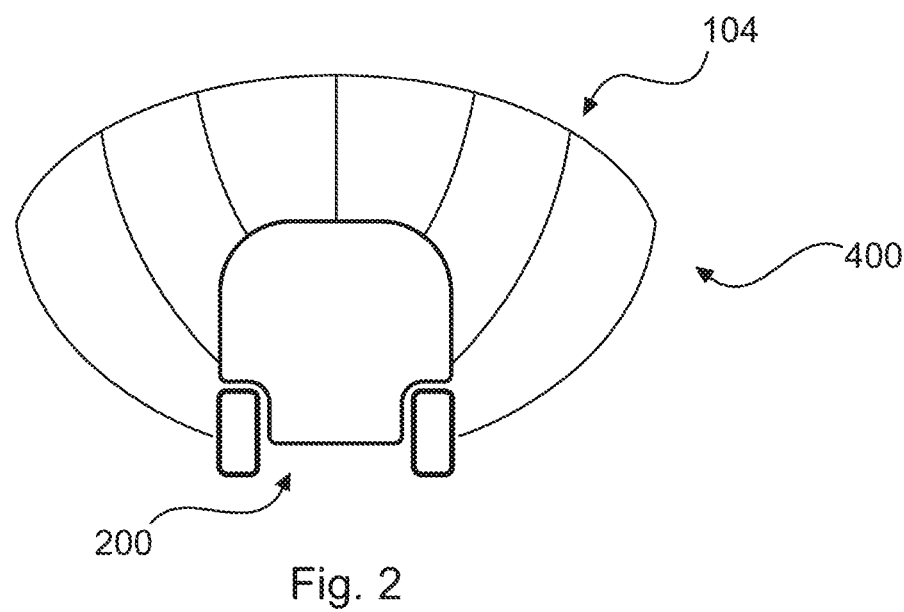
FIG. 2 shows a schematic representation of the parking assistance system according to an exemplary embodiment.

FIG. 2 shows a schematic representation of the grid structure 104 which presents the surroundings 400 of the vehicle 200. The image recorded by the camera 102 can be projected onto the grid structure 104 and/or the adapted grid structure 108 and the resulting model can be displayed to a user on a display.

Figure 3:
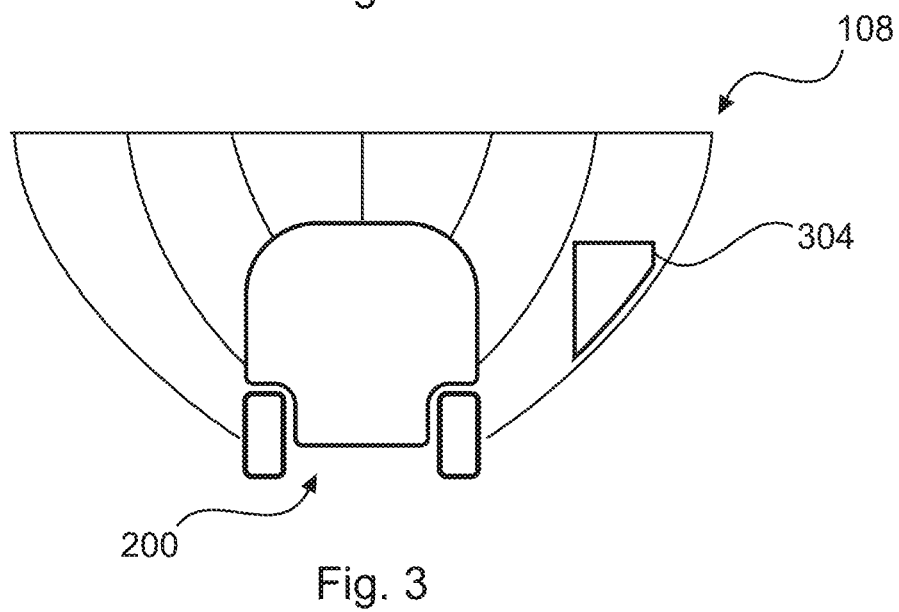
FIG. 3 shows a schematic representation of the parking assistance system according to an exemplary embodiment.

A schematic representation of an adapted grid structure 108 is shown in FIG. 3, wherein the adapted grid structure can be modified both in its form and a generic vehicle model 304 can be provided in the adapted grid structure 108. The orientation of the generic vehicle model 304 corresponds to the orientation 302 of the other vehicle 300.

Figure 4:
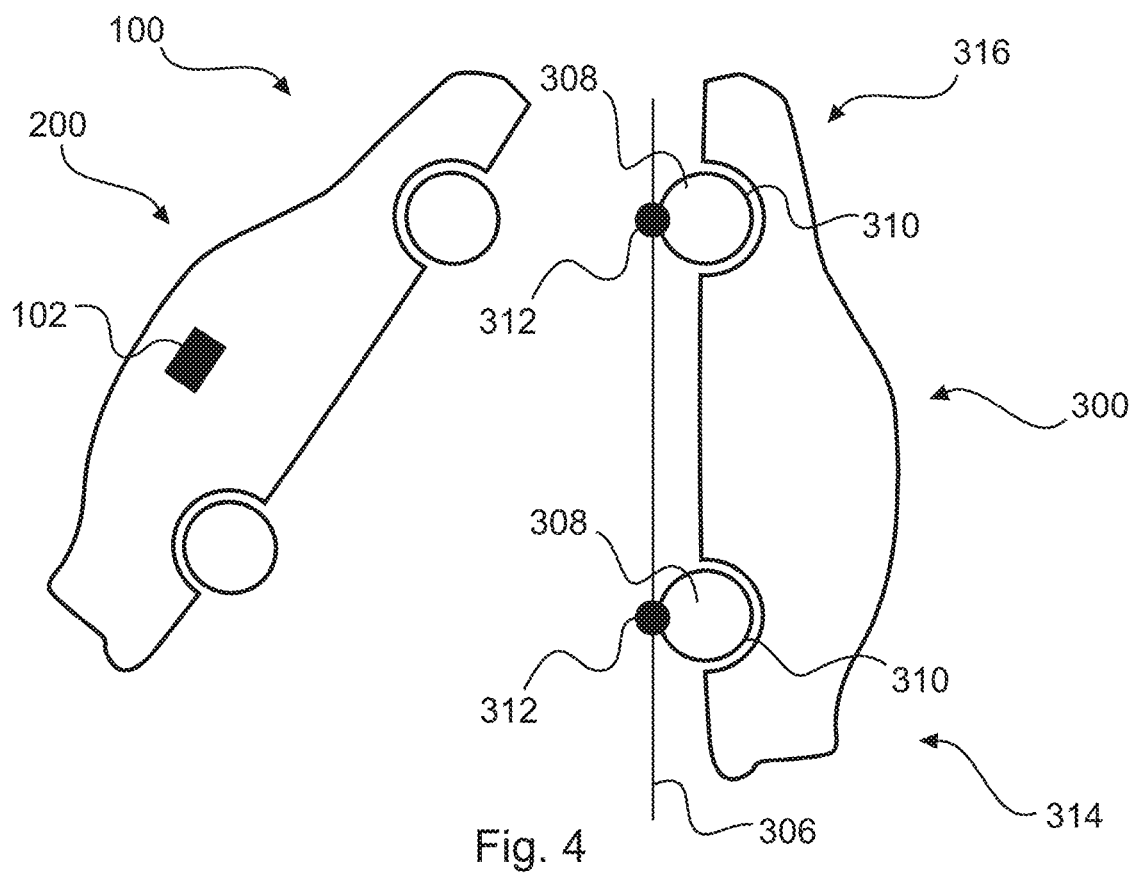
FIG. 4 shows a schematic embodiment of the parking assistance system according to an exemplary embodiment.

FIG. 4 shows a schematic representation of the establishment of an intersection 312. The parking assistance system 100, which can be provided in the vehicle 200, has a camera 102. Another vehicle 300 is located next to the vehicle 200. The vehicle 300 stands on a bottom surface 306. The other vehicle 300 stands in particular on its wheels 308. It can be assumed that the wheels 308 stand orthogonally on the bottom surface 306. The image evaluation unit 106 can be in a position to establish a circumferential contour 310 of the wheels 308. Likewise, the image evaluation unit 106 can be in a position to determine the orientation 302 of the other vehicle 300 by establishing the intersections 312. The intersections 312 can be established in that the point on the circumferential contour 310 of the wheels 308 closest to the camera 102 is established. In addition, the camera 102 can establish a front region 316 and a rear region 314 of the other vehicle 300. The generic vehicle model 304 can be adapted in its contour or appearance to the front region 316 and/or the rear region 314.

Figure 5:
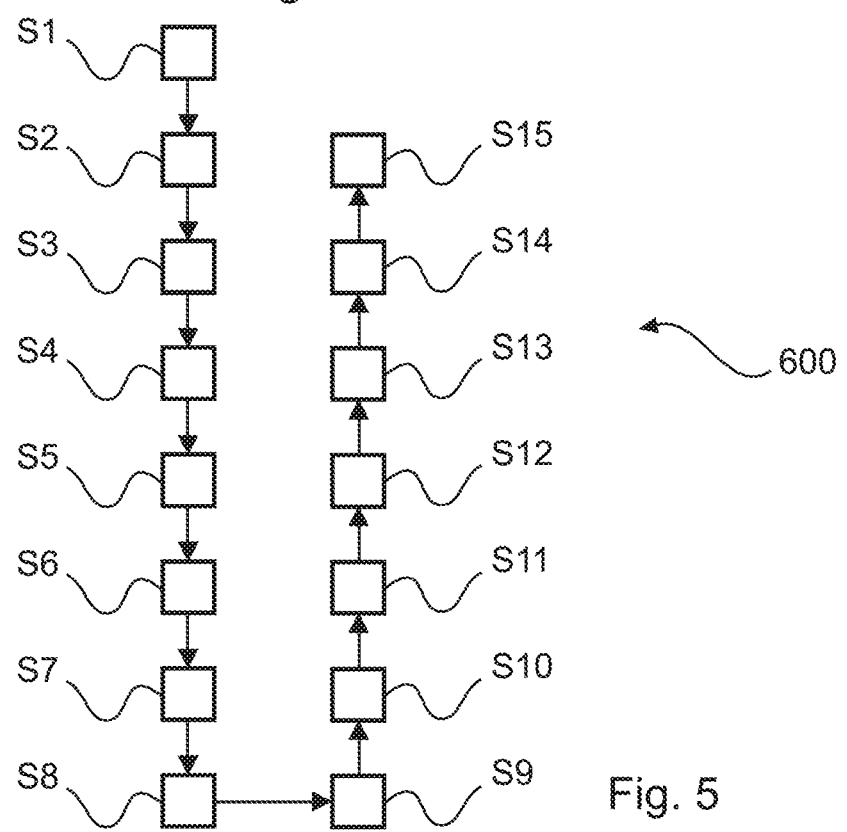
FIG. 5 shows a flow chart in order to illustrate steps of a method for presenting the surroundings of a vehicle according to an exemplary embodiment.

FIG. 5 shows a flow chart in order to illustrate steps of a method for presenting the surroundings 400 of a vehicle 200 according to an exemplary embodiment. The method 600 includes recording at S1 an image of the surroundings 400 of a vehicle. The surroundings 400 are presented at S2 using a grid structure. An orientation of another vehicle 300 depicted in the image is determined at S3. The grid structure is adapted at S4 on the basis of the orientation of the other vehicle 300. The image is projected at S5 onto the adapted grid structure. A bottom surface of the image is recognized at S6. Two wheels of the other vehicle 300 are identified at S7. At S8, a circumferential contour of the wheels is established. An intersection is formed at S9 between the bottom surface and the circumferential contour of the wheel closest to the camera. The orientation of the other vehicle 300 is determined at S10 on the basis of the intersection. A geometrical form, such as a hemisphere, is configured in S11. The geometrical form is modified at S12, which may be by bending or the like, on the basis of the orientation of the other vehicle 300 in order to configure the adapted grid structure. At S13, a generic vehicle model is formed, and the generic vehicle model is positioned in the geometrical form at S14. At S15, the generic vehicle model is adjusted by scaling, movement and/or rotation, on the basis of the orientation of the other vehicle 300 in order to configure the adapted grid structure.

Moreover, it is pointed out that "having" and "comprising" do not exclude any other elements and the indefinite article "a" does not exclude a plurality. It is further pointed out that features, which have been described with reference to one of the above exemplary embodiments, can also be used in combination with other features of other exemplary embodiments described above. Reference numerals in the claims are not to be deemed to be restrictions.

The invention claimed is:

1. A parking assistance system for a vehicle, designed to present surroundings of the vehicle, having:
   at least one camera configured to record at least one image,
   wherein the parking assistance system uses a grid structure to present the surroundings of the vehicle for a user, and
   an image evaluation unit having an image processor and an input connected to an output of the at least one camera, configured:
      to determine an orientation of another vehicle depicted in the at least one image,
      to adapt the grid structure on the basis of the determined orientation of the other vehicle, and
      to project the at least one image onto the adapted grid structure,
   wherein the grid structure comprises a geometrical form and the image evaluation unit is configured to adapt the geometrical form, by at least one of bending or rotating, to the orientation of the other vehicles,
   wherein the grid structure additionally comprises a generic vehicle model, and
   wherein the image evaluation unit is configured to adapt the generic vehicle model, by at least one of scaling, movement or rotation of the generic vehicle model within the geometrical form, to the orientation of the other vehicle, resulting in each of the geometrical form and the generic vehicle model being adapted.

2. The parking assistance system according to claim 1, wherein the at least one of bending or rotating comprises bending to the orientation of the other vehicle.

3. The parking assistance system according to claim 1, wherein the image evaluation unit for determining the orientation of the other vehicle is configured:
   to recognize a bottom surface in the at least one image,
   to identify at least two wheels of the other vehicle in the at least one image,
   to determine a circumferential contour of the wheels in each case, to form an intersection between the bottom surface and the circumferential contour in each case, by determining a point on the circumferential contour of the wheel closest to the camera.

4. The parking assistance system according to claim 3, wherein the image evaluation unit is further configured to perform a plausibility check of at least one of the bottom surface, the wheels, the circumferential contour, the intersections or the orientation of the other vehicle.

5. The parking assistance system according to claim 1, wherein the image evaluation unit is configured to establish at least one of a front region or a rear region of the other vehicle, and to orientate the grid structure on the basis of the at least one of the front region or the rear region.

6. A method for presenting the surroundings of a vehicle, comprising:
   recording an image of the surroundings of the vehicle with a camera,
   presenting the surroundings of the vehicle using a grid structure,
   recognizing, by an image evaluation unit comprising an image processor and an input connected to an output of the camera, a bottom surface in the image,
   identifying, by the image evaluation unit comprising the image processor, at least two wheels of another vehicle in the image,
   determining, by the image evaluation unit comprising the image processor, a circumferential contour for each of the at least two wheels,
   forming, by the image evaluation unit comprising the image processor, an intersection between the bottom surface and the circumferential contour by establishing determining a point on the circumferential contour of the wheel closest to the camera,
   determining, by the image evaluation unit comprising the image processor, an orientation of the other vehicle depicted in the image on the basis of the intersection,
   adapting, by the image evaluation unit comprising the image processor, the grid structure on the basis of the orientation of the other vehicle, and
   projecting, by the image evaluation unit comprising the image processor, the image onto the adapted grid structure.

7. The method according to claim 6, further comprising: configuring a geometrical form,
   modifying the geometrical form on the basis of the orientation of the other vehicle in order to configure the adapted grid structure.

8. The method according to claim 7, further comprising: forming a generic vehicle model,
   positioning the generic vehicle model in the geometrical form,
   adjusting the generic vehicle model by at least one of scaling, movement or rotation in the geometrical form, on the basis of the orientation of the other vehicle in order to configure the adapted grid structure, resulting in each of the geometrical form and the generic vehicle model being adapted based on the orientation of the other vehicle.

9. The method according to claim 7, wherein the geometrical form comprises a hemisphere.

10. The method according to claim 7, wherein modifying the geometrical form comprises at least one of rotating or bending the geometrical form.

11. The method according to claim 10, wherein the at least one of rotating or bending the geometrical form comprises bending the geometrical form.

12. A program unit stored in non-transitory memory and which, when run in a parking assistance system, instructs the parking assistance system to perform the method according to claim 6.

13. The parking assistance system according to claim 7, wherein the geometrical form comprises a hemisphere.

14. A parking assistance system for a vehicle, configured to present surroundings of the vehicle, the system comprising:
   at least one camera configured to record at least one image,
   wherein the parking assistance system uses a grid structure to present the surroundings of the vehicle for a user, and
   an image evaluation unit having an input connected to an output of the at least one camera, configured to:
      determine an orientation of another vehicle depicted in the at least one image,
      adapt the grid structure on the basis of the determined orientation of the other vehicle, and
      to project the at least one image onto the adapted grid structure,
      wherein the grid structure comprises a geometrical form and a generic vehicle model, wherein the image evaluation unit is configured to adapt the generic vehicle model by at least one of scaling, movement or rotation of the generic vehicle model within the geometrical form to the orientation of the other vehicle, resulting in each of the geometrical form and the generic vehicle model being adapted.

15. The parking assistance system of claim 14, wherein the image evaluation unit determines the orientation of the other vehicle by being configured to:
   recognize a bottom surface in the at least one image,
   identify at least two wheels of the other vehicle in the at least one image,
   establish a circumferential contour of the wheels in each case, and
   form an intersection between the bottom surface and the circumferential contour in each case, by establishing a point on the circumferential contour of the wheel closest to the camera.

16. The parking assistance system of claim 14, wherein the image evaluation unit adapts the geometrical form by bending the geometrical form based on the orientation of the other vehicle.

* * * * *